Figure 1:
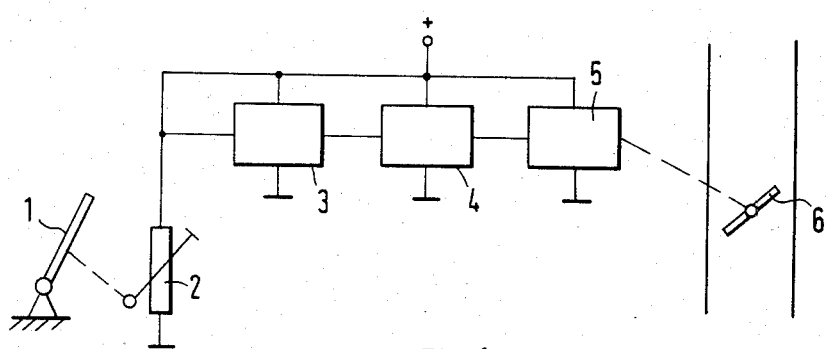

United States Patent [19]

Kessler et al.

[11] Patent Number: 4,543,933
[45] Date of Patent: Oct. 1, 1985

[54] CIRCUIT ARRANGEMENT FOR THE ACTUATION OF THE THROTTLE VALVE OF A MOTOR VEHICLE INTERNAL COMBUSTION ENGINE

[75] Inventors: Jochem Kessler, Karlsruhe; Bernd Heinrich, Rutesheim-Perouse, both of Fed. Rep. of Germany

[73] Assignee: Ing. h.c.F. Porsche AG, Fed. Rep. of Germany

[21] Appl. No.: 474,328

[22] Filed: Mar. 11, 1983

[30] Foreign Application Priority Data

Mar. 16, 1982 [DE] Fed. Rep. of Germany ....... 3209463

[51] Int. Cl.⁴ .............................................. F02D 9/02
[52] U.S. Cl. .................................... 123/361; 123/399
[58] Field of Search ................................. 123/361, 399

[56] References Cited

U.S. PATENT DOCUMENTS

| 4,112,885 | 9/1978 | Iwata et al. | 123/361 |
| 4,169,437 | 10/1979 | Fleischer | 123/361 |
| 4,305,359 | 12/1981 | Mann et al. | 123/399 |
| 4,319,658 | 3/1982 | Collonia et al. | 123/361 |
| 4,430,975 | 2/1984 | Ishida et al. | 123/399 |

Primary Examiner—Parshotam S. Lall
Assistant Examiner—W. R. Wolfe
Attorney, Agent, or Firm—Craig & Burns

[57] ABSTRACT

An active Wien-Robinson suppression filter connected as electrical filter in the electric transmission line from a drive-pedal potentiometer of a motor vehicle to the adjusting member of the throttle valve of the internal combustion engine; the jerking of the motor vehicle which otherwise occurs frequently, can be avoided with the use of such a filter.

2 Claims, 2 Drawing Figures

CIRCUIT ARRANGEMENT FOR THE ACTUATION OF THE THROTTLE VALVE OF A MOTOR VEHICLE INTERNAL COMBUSTION ENGINE

The present invention relates to an electric circuit arrangement for actuating the throttle valve of a motor vehicle internal combustion engine with a drive pedal, whose rotary position is converted into a corresponding voltage of a potentiometer connected therewith, whereby the voltage is transmitted to an electric adjusting member for the actuation of the throttle valve by way of a control apparatus.

Such types of circuit arrangements described, for example, in the German Auslegeschrift No. 29 47 688, by means of which the rotary position of the throttle valve is electrically controllable by the drive pedal of the motor vehicle, are used preferredly in new engines, among others in engines which are equipped with an electronically controlled cylinder cut-off. They are also designated as E-gas pedal and offer, in addition to numerous other advantages, the possibility to constitute the coordination of the drive pedal position to the throttle valve position according to a linear, progressive, or degressive characteristic curve stored in a control apparatus. With a degressive transmission, a larger throttle valve movement is coordinated to a small drive pedal movement. Thus, during the acceleration of the vehicle in the lower speeds, a rapid increase of the engine output is effected. A characteristic transmission curve designed for optimum fuel consumption includes a kink within a certain area. When passing over this area or also during other load changes, there results frequently a periodically alternating, horizontal vehicle acceleration, i.e., a jerking of the vehicle, which occasionally may occur also during a constant drive and, once initiated, remains preserved for long periods of time. The driver of the vehicle thereby acts as a type of feedback in that he actuates the drive pedal unintentionally rhythmically by means of the foot.

The inventive feature which consists of the interconnection of an electric filter, a phase shifter or a delay element into the connecting line from the drive pedal potentiometer to the adjusting member of the throttle valve, has proved as a surprisingly effective remedial measure. An active Wien-Robinson suppression filter is preferably used as filter, which is adjusted to the most frequently occurring jerking frequency of about 2.6 hertz. The unpleasant and distracting jerking of the vehicle which is dangerous in many traffic situations, can be eliminated by means of such a filter in a simple and cost-favorable manner. Such an electric suppression filter can also be incorporated into the electric control system of a fuel-injection system.

Figure 2:
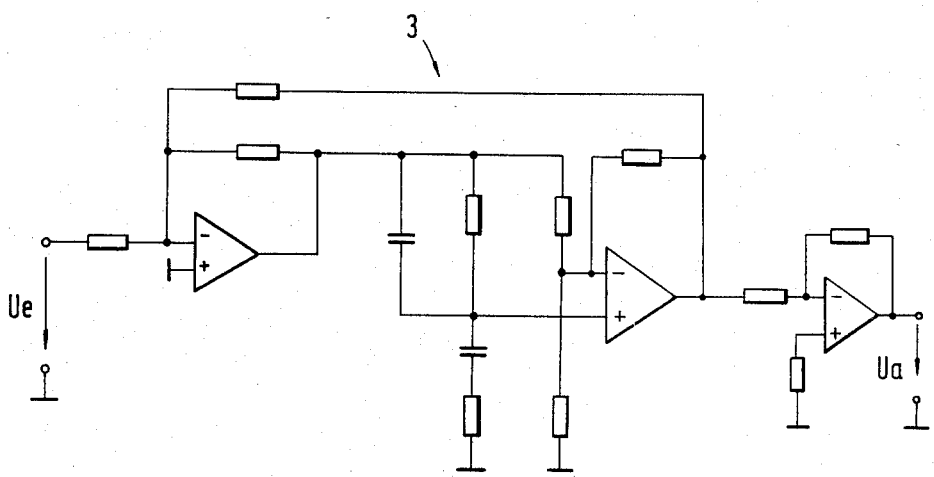

These and other objects, features and advantages of the present invention will become more apparent from the following description when taken in connection with the accompanying drawing which shows, for purposes of illustration only, one embodiment in accordance with the present invention, and wherein:

FIG. 1 is a schematic block diagram of a circuit arrangement in accordance with the present invention; and FIG. 2 is a schematic diagram of a so-called Wien-Robinson suppression filter used with the present invention.

Referring now to the drawing wherein like reference numerals are used throughout the two views to designate like parts, and more particularly to FIG. 1, a potentiometer 2 which is connected with the drive pedal 1, applies a voltage corresponding to the drive pedal position to a control apparatus 4 of known construction. An electric filter 3 is connected between the potentiometer 2 and the control apparatus 4, which is commercially available under the designation Wien-Robinson suppression filter. Its electric circuit illustrated in FIG. 2 is taken from the book, *Halbleiter-Schaltungstechnik* ("Semiconductor Circuit Techniques"), page 316, Springer Publishers, and has been completed by an inverter in the output thereof. Since the Wien-Robinson suppression filter is described in detail in this publication, a detailed description thereof is dispensed with herein. The filter has an attenuation of about 40 db and a filter quality of 1; it is therefore relatively wide-band and is adjusted to a frequency of about 2.6 hertz.

An electric adjusting member 5 of any conventional type which is connected to the output of the control apparatus 4, actuates the throttle valve 6. All of the electrical structural elements of the transmission are connected in series and are connected in parallel with the power supply between its positive terminal and ground.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A circuit arrangement for the actuation of a throttle valve of a motor vehicle internal combustion engine having a drive pedal, whose rotary position is converted into a corresponding voltage of a potentiometer connected therewith, said voltage being transmitted by way of a control apparatus to an electrical adjusting member for the actuation of the throttle valve, characterized by further means for effectively eliminating jerking of the motor vehicle within a predetermined frequency range, wherein the further means is an active Wien-Robinson suppression filter whose resonant frequency is tuned to the oscillating frequencies to be suppressed of about 2 to 3 hertz connected between the potentiometer and the control apparatus.

2. A circuit arrangement according to claim 1, characterized in that the oscillating frequency to which the filter is tuned is approximately 2.6 hertz.

* * * * *